United States Patent [19]

Colling

[11] Patent Number: 4,574,431
[45] Date of Patent: Mar. 11, 1986

[54] KNIFE FOR FILLETING FISH

[76] Inventor: Larry J. Colling, 9931 18th Ave. W. #28, Everett, Wash. 98204

[21] Appl. No.: 672,889

[22] Filed: Nov. 19, 1984

[51] Int. Cl.⁴ .............................................. A22C 25/16
[52] U.S. Cl. .................................... 17/66; 30/279 R; 30/280
[58] Field of Search ...................... 30/278, 279 R, 280; 17/56, 66, 69

[56] References Cited

U.S. PATENT DOCUMENTS 1,261,689  4/1918  Bristle ............................... 30/280 X
4,383,367  5/1983  Mielnicki ........................... 30/279 R Primary Examiner—Willie G. Abercrombie
Attorney, Agent, or Firm—Robert W. Jenny

[57] ABSTRACT

The subject filleting knife has a cutting element having two cutting edges starting from the juncture of the blade element and handle and extending to a point part way along the element at which the two edges merge into a single edge. The knife thus serves the functions of both single blade and double blade filleting knives. It allows a significant improvement in the efficiency of the process of filleting in terms of time, skill and care required relative to the quality of the fillets produced and reduction of wastage. Safety is enhanced.

12 Claims, 6 Drawing Figures

KNIFE FOR FILLETING FISH

BACKGROUND OF THE INVENTION

1. Field of the Art

This invention is in the field of cutlery. More specifically it is in the field of knives for cutting meat. Still more specifically it is in the field of knives used for filleting fish.

2. Prior Art

Explanation of the prior art of this invention and of the invention itself will be facilitated by a brief description of a conventional technique used for filleting a fish, i.e. removing from a fish those portions of the fish termed the fillets. The fillets of a fish are the fleshy portions, exclusive of the head, collar, backbone, belly bones, fins, tail, stomach cavity and its contents and essentially all other bones. In other words, the fillets are the more edible portions of the fish.

Filleting can be done with knives of standard, conventional shapes and proportions but the process is expedited by use of knives designed for the purpose. Such knives generally have a slender blade which curves gently upward toward the tip. The filleting process, method or technique comprises essentially the following steps, starting with the fish beheaded, cleaned and laid on its side on a cutting surface:

1. Cut off the collar.
2. Cut off the belly fins.
3. Cut off the anal fin.
4. Cut off the back fins (adipose and dorsal).
5. Make an incision with the knife blade essentially parallel to the cutting surface and running along the upper side of the backbone, the full length of the fish and exiting just above the tail.
6. Make a similar cut but with the knife running along the underside of the backbone and exiting just under the tail. (The tail remains attached to the backbone.)
7. Remove belly bones, using a few cuts.

In the commercial processing of fish it is highly important that each fish fillet must be filleted as quickly as feasible in order to minimize costs, particularly labor costs. Consideration of the seven steps of the conventional filleting process brings out the fact that time could be saved if steps 5 and 6 could be done simultaneously. The knife of U.S. Pat. No. 2,397,875 was intended to accomplish steps 5 and 6 simultaneously. As explained in that patent, the patented knife is actually two knives which can be fastened together, with their blades parallel and spaced a fixed distance apart to make the dual cuts of steps 5 and 6. However, it is necessary to separate the knives and use only one for the other steps or else to use one double bladed knife and one single bladed knife. In either case, valuable time is used, either in (1) separating and joining two knives, including the time to put down and pickup one of the knives or (2) putting down and picking up the knives if two separate knives are used, (one single bladed, one double bladed).

Further, in the commercial processing of fish it is essential that there be a minimum of wastage of the edible portion of the fish and that any tools and techniques be readily adaptable to the wide variety of sizes and shapes of fish being processed. The patented knife presents problems in regard to both these requirements. The parallel blades a fixed distance apart will leave considerable useful edible portions of smaller fish and will not fit over the backbone of larger fish unless knives in a range of sizes are used. Using a range of knives involves extra costs in knife inventory, maintenance etc. and involves extra time in the selection and handling needed to find and use the right knife for each fish.

A further consideration in regard to filleting fish is that processing requiring filleting fish is highly labor intensive. The degree of economic success in such processing depends strongly on the requirement to fillet fish with minimum wastage in minimum time.

The time required for a given skill level is directly related to the care needed to keep wastage to a minimum. It follows that if an implement enables a person of a given skill level to do work of a given quality with less care, then the time required will be less and costs correspondingly decreased.

Filleting of fish by casual and/or sports fishermen and women also involves problems in terms of the practice and skill required to be able to satisfactorily and safely fillet fish. For satisfactory filleting the knife should be as sharp as reasonably possible and holding and cutting a fish carcass presents the possibilities for injuries to the person doing the work.

The patents listed below were found in a preliminary search of the art in the field of the subject invention. These patents, singly or in combinations, do not show or teach the concept of the subject invention a knife which combines single and double blade capabilities.

U.S. Pat. No. 655,301
U.S. Pat. No. 1,847,062
U.S. Pat. No. 2,397,875
U.S. Pat. No. 1,226,797
U.S. Pat. No. 2,034,490
U.S. Pat. No. 2,528,166
U.S. Pat. No. 270,722 BRIT.
U.S. Pat. No. 1,360,765
U.S. Pat. No. 2,051,680
U.S. Pat. No. 3,270,368

Therefore, the prime objective of the subject invention is the reduction of the time required to fillet fish with minimal wastage.

Further objectives in support of the prime objective are that (1) the time reduction can be achieved using one implement only for the filleting process; (2) one size of implement can be used on a range of sizes of fish while maintaining minimal wastage; (3) the filleting process comprises fewer steps; and (4) the implement can be manufactured and maintained using well known materials and techniques.

A further objective is to provide a filleting knife which requires less skill and/or practice to fillet satisfactorily and safely.

SUMMARY OF THE INVENTION

The subject invention is a knife having single blade and double blade capabilities. In one embodiment it is a knife having two blades. The blades are identical except that they are of opposite hand and one blade is truncated at a point located between ½ and ⅔ of the length of the other blade. The blades are parallel to each other, broad side to broad side, spaced a distance apart at their juncture with the knife handle and joined at the tip of the truncated blade. The distance between the blades is such that the crossectional dimension of the backbones of fish in the size range accomodated by a given knife will fit between the blades at points near the joining point for smaller fish and about midway between the joining point and the handle for the larger fish. The combination double edge single edge apparatus can be referred to as the cutting element of the knife.

An essential feature of the knife is that the portion of the full length (not truncated) blade extending beyond the joining point is used as a single bladed knife and the blade portions between the handle and the joining point are used as a double bladed knife.

In filleting a fish which has been beheaded, cleaned and laid on its side on a work surface, the subject knife is used in its single blade capacity to:

(1) Cut off the collar.
(2) Cut off the belly fins.
(3) Cut off the anal fin and
(4) Cutting in an essentially horizontal plane parallel to the work surface, make an incision extending from the bottom centerline of the fish up to the backbone and from the aft end of the belly cavity to the tail.

Then, using the knife in its double bladed capacity, (5) At the head end of the carcass, position the knife so that the facing surfaces of the two blades are one on each side of and in contact with the backbone near its forward end and, cutting again in an essentially horizontal plane, cut toward the tail for the full length of the fish, keeping the facing surfaces in contact with the backbone.

Using the knife again as a single bladed knife:
(6) Remove the belly bones with a few cuts.

With the subject knife, in step 5, both fillets are separated from the carcass in one step. Also it is not necessary to cut off the adipose and dorsal fins. As a result, experience has shown that for a skilled person the time to fillet a fish is about $\frac{1}{2}$ to $\frac{2}{3}$ that for conventional techniques. Also, experience has shown that the quality of the results achieved relative to a person's skill and experience in filleting fish is significantly improved with the subject knife and the quality and speed combination improves more rapidly with practice with the subject knife than with conventional knives and techniques.

The knife clearly meets the stated objectives in regard to usage. Further, it is made of conventional materials by conventional techniques and is maintained with conventional techniques. Experience has shown that the double bladed portion of the knife is kept satisfactorily sharpened when the sharpening is effected on only the outer sides of the edges of the blades, i.e. the sides of the blades not facing each other. However, special techniques for working the "insides" of the double bladed portion are helpful.

The varied, tapered distance between the cutting edges of the double bladed portion of the knife adapts it to use on a range of sizes of fish. Primarily, the knife is a combination single blade and double blade knife. This feature results in the primary benefit that no time is used in whatever way to interchange between single blade and double blade operations. The nature and novelty of the invention are described in more detail in the following detailed description in reference to the noted drawings.

DETAILED DESCRIPTION OF THE INVENTION

The subject invention is described in detail with reference to the described drawings. The invention in one preferred embodiment is a knife 10 comprising a handle 11, a complete blade 12 and a truncated blade 13.

Figure 1:
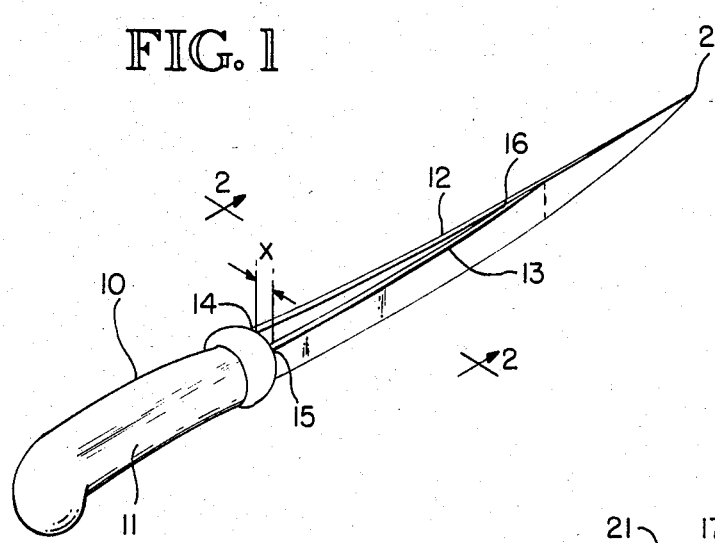
FIG. 1 is a perspective view of the subject invention in a basic form.
Figure 2:
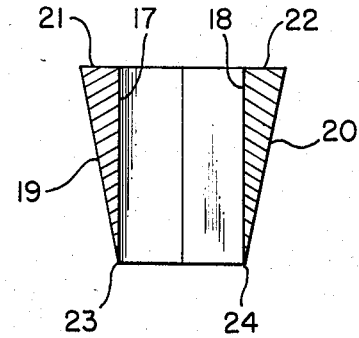
FIG. 2 is a sectional view taken at 2—2 in FIG. 1.

The blades are integral with the handle or integrated with it, using any of a variety of techniques well known in the art. They are located side by side and a distance X apart at their junctures 14 and 15 with handle 11. They are joined at 16 using any suitable technique well known in the art, such as welding or brazing. The blades are triangular in crossection as shown in section in FIG. 2, the section taken at 2—2 in FIG. 1. As shown in FIG. 2 blade sides 17 and 18, facing each other, are essentially parallel and sides 19 and 20 taper from tops 21 and 22 to cutting edges 23 and 24. The blades are essentially identical in planform except, of course, that complete blade 12 extends beyond blade 13 to point 25. The planform of blade 12 is that of the class of knives designed for filleting fish, curving upward somewhat toward the tip (point 25). The joining point of the blades can be anywhere along blade 12, preferably between $\frac{1}{8}$ and $\frac{3}{4}$ the distance from handle to tip and, more preferably, between $\frac{1}{2}$ and $\frac{1}{8}$ the distance from handle to tip.

Figure 3:
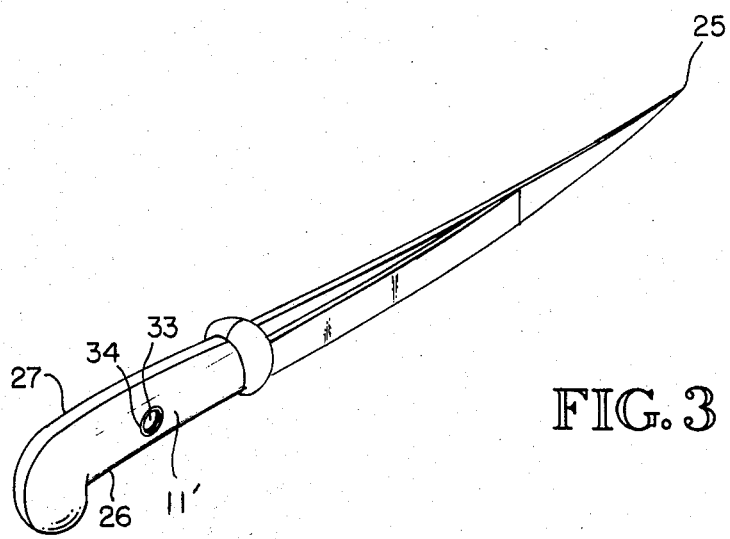
FIG. 3 is a perspective view of the subject invention in an embodiment allowing mechanical assembly of the parts.
Figure 4:
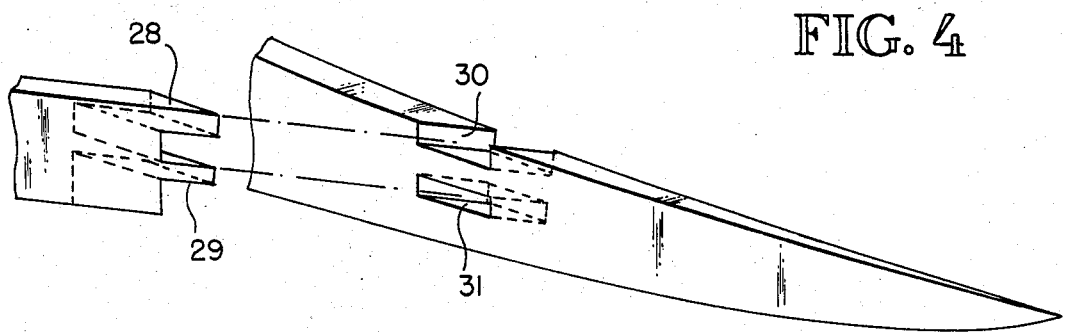
FIG. 4 illustrates the details for mechanically joining the two blades.
Figure 5:
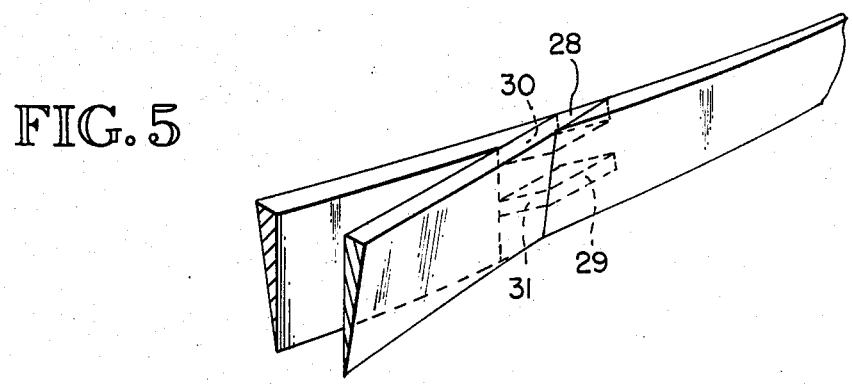
FIG. 5 illustrates the two blades mechanically joined.

For purposes of easier sharpening and cleaning of the knife it can be embodied in a way permitting separation of the blades and one such an embodiment is illustrated in FIGS. 3, 4 and 5.

Referring to FIG. 3, handle 11' is made in two parts, a right part 26 and a left part 27. A blade extends from each part, in the illustrated embodiment the complete blade being fastened in the left part and the truncated blade in the right part. As shown in FIG. 4 the truncated blade has two projections 28 and 29 at its end. These projections fit into openings 30 and 31 respectively in the complete blade, opening 30 being a groove and 31 a hole. To assemble the knife the projections are slid into the groove and hole as shown in FIG. 5 and the handle parts are fastened together by machine screw 32, FIG. 3. Head 33 of the screw is in countersink 34 to eliminate any projection on the smooth surface of the handle. The thread on the screw engages mating thread in the left handle part 29.

In still another embodiment, not shown in the drawings, the truncated blade is detachably attached to the handle and the complete blade. One end of the truncated blade is attached to the complete blade using the protrusions and openings as previously described. The other end is fastened into a recess in the handle using any means well known in the art such as countersunk flat head machine screws.

Figure 6:
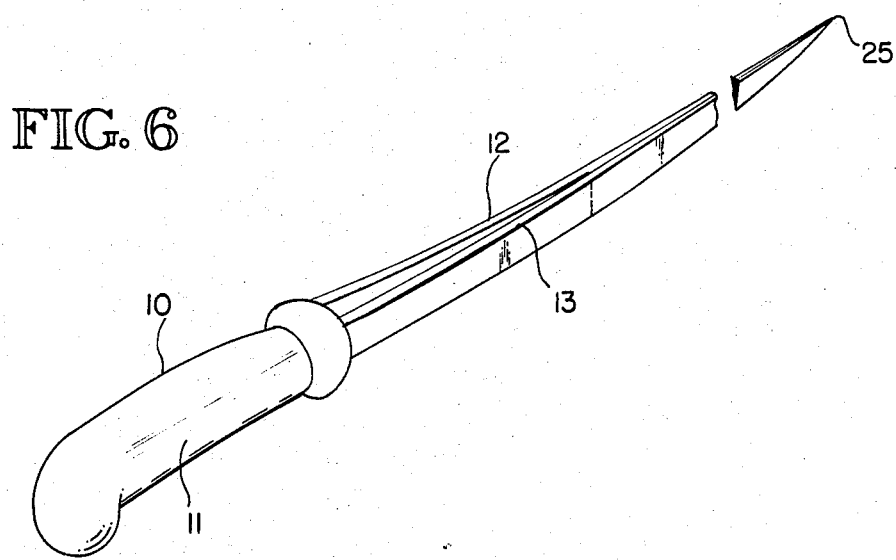
FIG. 6 is a perspective view of a second basic embodiment.

In yet another embodiment, illustrated in FIG. 6, both blades are full length and are joined at a point located a fraction of the distance between the juncture of the blades and handle and the ends of the blades. In effect, the cutting element of the knife comprises a double cutting edge portion and a single cutting edge portion. The edges of the double edged portion are spaced apart at the juncture with the handle and come together at the juncture with the single edge portion. The fraction is in the range of 1/5 to 4/5, preferably about 2/3.

The blades are wedge shaped in crossection with the sides that face each other parallel as indicated in FIG. 2 for the previously described embodiment so that in the joined portion the crossection is as shown in FIG. 6. The top portion of the wedge narrows to virtually zero at the tip.

The blades can be permanently joined or detachably attached using countersunk flat head machine screws or various arrangements of projections and holes. With the blades detachable from each other the handle is made in two parts with a blade fastened in or to each part or one blade can be attached to the handle and the other blade.

With this embodiment it is feasible to activate the blades, moving them axially relative to each other in the manner of the electrically driven carving knives which have been commercially available for some time.

Regarding the use of this knife and its advantages in terms of reduced time and skill requirement relative to the care needed and wastage produced in the filleting process, the filleting process using a conventional knife comprises essentially the following steps, starting with the fish beheaded, cleaned and laid on its side on a cutting surface:

1. Cut off the collar. 2. Cut off the belly fins.
3. Cut off the anal fin.
4. Cut off the back fins (adipose and dorsal).
5. Make an incision with the knife blade essentially parallel to the cutting surface and running along the upper side of the backbone, the full length of the fish and exiting just above the tail.
6. Make a similar cut but with the knife running along the underside of the backbone and exiting just under the tail. (The tail remains attached to the backbone.)
7. Remove belly bones, using a few cuts.

In direct comparison, in filleting a fish which is beheaded, cleaned and laid on its side on a work surface this subject knife is used in its single blade capacity to:
(1) Cut off the collar.
(2) Cut off the belly fins.
(3) Cut off the anal fin and
(4) Cutting in an essentially horizontal plane parallel to the work surface, make an incision extending from the bottom centerline of the fish up to the backbone and from the aft end of the belly to the tail.

Then, using the knife in its double bladed capacity,
(5) at the head end of the carcass, position the knife so that the facing surfaces of the two blades are one on each side of and in contact with the backbone near its forward end and, cutting again in an essentially horizontal plane, cut toward the tail for the full length of the fish, keeping the facing surfaces in contact with the backbone.

Using the knife again as a single bladed knife:
(6) Remove the belly bones with a few cuts.

Note that with the subject knife step 4 and 6 of the conventional process are eliminated and step 4 of in the new process is an added step. Experience has shown that step 4 of the new process takes less time than step 4 in the conventional process because the new step 4 requires less handling of the carcass and is less cumbersome than removing fins. Also steps 5 and 6 in the conventional process require the most time, skill and care of all the steps in order to minimize wastage and produce high quality, well cut fillets. Therefore the elimination of step 6 of the conventional process saves appreciable time. The technique of keeping the facing surfaces of the blades close to the backbone, in combination with the time saving differences in the processes, significantly reduces the time, skill and care needed relative to the quality of the fillets produced. Furthermore, safety is enhanced, for all levels of experience and skill.

The knife clearly meets the stated objectives in regard to usage. Further, it meets the objective of being made of conventional materials by conventional tehcniques and can be maintained using conventional techniques for sharpening and cleaning. It has been found that with the blades permanently attached at the joining point, satisfactory sharpening can be readily achieved by working the outer surfaces only of the blades, i.e the surfaces facing away from each other. In the embodiments with detachable blades, sharpening can be entirely conventional.

Several embodiments of the subject invention are described in this specification and it will be readily understood there may be other embodiments or changes in the described embodiments without departing from the essence of the invention, the scope of which is limited only by the appended claims.

What is claimed is:

1. A knife comprising:
   a handle,
   a first blade having a side, a length Y and a first juncture with said handle,
   a second blade having a side, an end, a length Z, and a second juncture with said handle,
   the ratio of said length Z and said length y being a fraction,
   said second blade being essentially identical to said first blade but truncated to produce said length Z,
   said first and said second blades extending from said handle said side by said side and with said first juncture a distance X from said second juncture,
   said distance X being in the range of ⅛ inch to 1 inch,
   said end of said second blade being attached to said first blade.

2. The knife of claim 1 in which said second blade is permanently attached to said first blade.

3. The knife of claim 1 further comprising measns for detachably attaching said second blade to said first blade.

4. The knife of claim 3 in which said means for detachably attaching said second blade to said first blade comprises:
   at least one protrusion on said end of said second blade,
   at least one opening in said first blade for said at least one protrusion on said second blade,
   said protrusion engaging said opening to attach said second blade to said first blade,
   said handle comprising a first part and a second part and means for detachably attaching said first part to said second part,
   said first blade being integrated with said first part,
   said second blade being integrated with said second part,
   whereby said second blade is attached to said first blade by engaging said at least one protrusion in said at least one opening and then attaching said first part of said handle to said second part.

5. The knife of claim 1 in which said fraction is in the range of ⅛ to ¾.

6. The knife of claim 2 in which said fraction is in the range of ⅛ to ¾.

7. The knife of claim 3 in which said fraction in in the range of ⅛ to ¾.

8. THe knife of claim 4 in which said fraction is in the range of ⅛ to ¾.

9. The knife of claim 1 further comprising means for detachably attaching said second blade to said handle and said first blade.

10. A knife comprising:
   a handle,
   a cutting element extending from said handle and having a first juncture with said handle,
   said cutting element having a first cutting portion having two cutting edges and a second cutting portion having one cutting edge,
   said first cutting portion having a length V and said second cutting portion having a length W,
   said first and second portions having a second juncture,
   said first cutting portion being between said handle and said second cutting portion,
   said second cutting portion and each of said cutting edges of said first cutting portion being within 10° of being in alignment with each other.

11. The knife of claim 10 in which:
   said cutting edges of said first cutting portion are spaced apart a distance U at said first juncture and come together at said second juncture,
   said distance U is in the range of ⅛ inch to 1 inch and,
   the ratio of said length V to said length W is in the range of 1 to 4 and 4 to 1.

12. A knife having a handle and a cutting element extending from said handle,
   said cutting element comprising a first blade component and a second blade component,
   said first and second components having equal lengths and being joined over a portion of said lengths to form a single edged portion of said cutting element and unjoined over a portion of said lengths to form a double edged portion of said cutting element having two cutting edges,
   said double edged portion being located between said handle and said single edged portion,
   said single edged portion and each of said cutting edges of said double edged portion being within 10° of being exactly in alignment with each other.

* * * * *